(12) United States Patent
Thomas et al.

(10) Patent No.: US 6,277,517 B1
(45) Date of Patent: Aug. 21, 2001

(54) ELECTROLYTE BAFFLING PLUG

(75) Inventors: Brian J. Thomas, Pewaukee; William J. Ross, Mukwonago, both of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/351,701

(22) Filed: Jul. 12, 1999

(51) Int. Cl.[7] .................................................. H01M 2/08
(52) U.S. Cl. ........................ 429/175; 429/72; 429/82; 429/84; 429/87; 429/88; 429/89; 429/177
(58) Field of Search ............................. 129/72, 82, 84, 129/87, 88, 89, 175, 177

(56) References Cited

U.S. PATENT DOCUMENTS

| | | | |
|---|---|---|---|
| 4,091,180 | * 5/1978 | Fox et al. .............................. | 429/89 |
| 4,371,591 | 2/1983 | Oxenreider et al. .................... | 429/88 |
| 4,851,305 | 7/1989 | Kump et al. ........................... | 429/84 |
| 5,284,720 | * 2/1994 | Thuerk et al. .......................... | 429/87 |
| 5,424,146 | 6/1995 | Lin ........................................ | 429/84 |
| 5,702,841 | * 12/1997 | Thomas et al. ........................ | 429/88 |
| 6,143,438 | * 11/2000 | Geibl et al. ............................ | 429/72 |

FOREIGN PATENT DOCUMENTS

| | | |
|---|---|---|
| 0 501 709 A1 | 9/1992 | (EP) . |
| 913125 | 12/1962 | (GB) . |

* cited by examiner

*Primary Examiner*—Carol Chaney
*Assistant Examiner*—Dah-Wei D. Yuan
(74) *Attorney, Agent, or Firm*—Quarles & Brady LLP

(57) ABSTRACT

A battery of the type having electrolyte therein, comprising a case defining at least one electrolyte containing cell, and a primary cover bonded to the case. The primary cover has a barrel extending into the electrolyte cell. A secondary cover is bonded to the primary cover top, and includes an aperture concentric with the primary cover barrel. A baffling plug is disposed in the secondary cover aperture and extends into the barrel. The baffling plug has a lid with a bottom, an inner tubular splash guard extending away from said lid bottom, an outer splash guard concentrically spaced from said inner tubular splash guard. A retaining member formed part of the plug base retains the plug in the aperture, and seals the aperture to prevent the escape of the electrolyte.

17 Claims, 5 Drawing Sheets

ELECTROLYTE BAFFLING PLUG

CROSS-REFERENCE TO RELATED APPLICATIONS

Not Applicable

STATEMENT REGARDING FEDERALLY SPONSORED RESEARCH OR DEVELOPMENT

Not applicable.

FIELD OF INVENTION

The present invention relates generally to the art of electric storage batteries, for example automotive and truck batteries. More particularly, the invention relates to venting systems for such batteries which provide a flow path for the escape of hydrogen and oxygen formed during the electrochemical reactions which take place in such batteries, while providing resistance to acid spewing. Still more specifically, the invention relates to a cover design so that it will not become entrained in the flow of gases escaping through the flow path of the venting systems.

BACKGROUND OF THE INVENTION

Conventional lead-acid batteries, such as those used for automobiles and trucks, generally include a number of cells disposed in a battery housing. Each cell typically includes a plurality of positive and negative battery plates or electrodes, and separators are sandwiched between the plates to prevent shorting and undesirable electron flow during the reactions which take place during manufacture and use of the batteries. The plates and separators are immersed in electrolyte disposed in the cells, the most common type of electrolyte being aqueous sulfuric acid and infrequently the electrolyte is in the form of a gel. The positive plate generally is constructed of a lead-alloy grid covered with lead oxide, while the negative plate generally contains lead as the active material, again covering a lead alloy grid.

In most battery constructions the battery housing includes a box-like base to contain the cells and which is made from a moldable resin. The housing is generally rectangular in horizontal cross-section, the cells being provided by vertical casing, the cover including terminal bushings and a series of filler holes to allow electrolyte to be added to the cells and to permit whatever servicing is required. To prevent undesirable spillage of electrolyte from the fill holes, most prior art batteries have included some sort of filler hole cap.

The electromotive potential of each battery cell is determined by the chemical composition of the electroactive substrates employed for the electrochemical reactions. For lead-acid batteries, such as those described above, the potential is usually about two volts per cell, regardless of cell volume. Vehicles manufactured by original equipment manufacturers (OEMs) typically require twelve volt batteries, so most of today's batteries include six cells (6 cells×2 volts per cell=12 volts). The size of the housing for the battery is selected for the "envelope" for a particular vehicle, i.e. the physical dimensions defined by the vehicle manufacturer for containment of the battery in the engine compartment.

Battery electrolyte spillage or spewing can be caused by a number of factors, including vibration or tilting as a vehicle maneuvers during normal use. Electrolyte escape may also be caused by battery overheating, a problem especially pronounced in recent years with smaller engines, which tend to run hotter than prior engines.

In addition to preventing spillage or spewing of electrolyte from the cells, the battery cover design and the filler caps need to perform an important and different function. This is because gases are liberated from lead-acid batteries during the charge and discharge reactions. Such reactions start at the time the battery is originally charged (called the "formation process"0) by the manufacturer or by the retailer or vehicle manufacturer. They also occur during normal operation of the battery. Factors such as high current charge and discharge conditions, and changes in temperature, can affect the rate at which gas evolution occurs. Control of gas generation and evolution in lead-acid battery construction is particularly important, because the gases are hydrogen and oxygen, and it is important to vent such gases in a controlled way from the battery to prevent pressure buildups in the housing which could lead to electrolyte leaks, housing failures, or most significantly explosions within the housing. It is also desirable, and well known, to prevent an external flame from entering the battery through gas exhaust ports.

The control for releasing gases from the electrolyte cells has often been accomplished by providing gas release slots on the primary cover in addition to the barrel openings. One drawback for providing such gas release slots is that during the formation process, the gas release slot become an additional passageway through which electrolytes escape. As a result, during the formation process, these gas release slots need to be blocked off in addition to the barrel openings.

Two of the problems previously mentioned, i.e. electrolyte spewing and gas evolution, are really interrelated and important in the construction of an effective cover and vent system. For example, electrolyte may enter the vent cap through several mechanisms. One mechanism is through vibrational or tilting flow of electrolyte in the cap, and another is through a mechanism frequently referred to as pumping. The latter occurs when gas evolved in the battery bubbles from the cells and carriers or forces electrolyte out the fill hole in into the cap. When electrolyte enters the caps of some prior designs it may be carried out the exhaust passageway and cause damage to external battery components, such as the battery terminals or adjacent engine components.

One particularly useful venting system to minimize the entrance of electrolyte into the flow path of the evolved gases is described in commonly owned U.S. Pat. No. 5,702, 841. The venting system includes a base containing the cells covered by a primary cover having a barrel extending into each cell. A secondary cover having baffles and splash guards is bonded to the primary cover to form chambers which allow the gases to escape while inhibiting the electrolyte from following the gas flow path. This particular system, however, requires filling the cells with electrolyte prior to bonding the secondary cover to the primary cover. The step of bonding the secondary cover to the primary cover, such as by heat sealing, after the cells are filled with the electrolyte adds an additional expense to the battery assembly process. It is preferable to accomplish all of the bonding processes prior to introducing the electrolyte into the cells.

SUMMARY OF THE INVENTION

The present invention provides a battery of the type having electrolyte therein, comprising a case defining at least one electrolyte containing cell, and a primary cover bonded to the case. The primary cover has a barrel extending into the electrolyte cell. A secondary cover bonded to the primary cover top, and an aperture concentric with the primary cover barrel. A baffling plug is disposed in the secondary cover aperture and extends into the barrel.

The baffling plug has an annular base having a top, bottom, and outer surface. A lid closes said base top, and splash guards prevent the electrolyte from splashing out of the cells while allowing gas to escape. A primary retaining member formed part of said base retains the plug in the aperture.

A general object of the present invention is to provide a battery which is economical to manufacture. This objective is accomplished by providing a battery with a cover comprising a primary and secondary cover bonded to the battery base prior to filling the cells with an electrolyte though the fill holes. The fill holes are sealed by pressing the baffling plugs into the fill holes.

Another objective of the present invention is to provide a baffling plug which inhibits the escape of electrolytes from the battery cell while providing a path for escaping gases. This objective is accomplished by providing a baffling plug having a pair of splash guards which is disposed in the fill hole for each cell.

Additional objects, features and advantages will become apparent upon consideration of the following detailed description.

DETAILED DESCRIPTION OF THE PREFERRED EMBODIMENTS

Before proceeding to the detailed description of the preferred embodiment, several general comments are warranted with regard to the applicability and the scope of the present invention.

First, the present invention is illustrated in connection with a centerline vent battery 10 shown in FIG. 1, in which the vents are aligned along the center axis of the battery, and a centerline post battery, in which the electrodes (or posts as they are commonly called) are aligned along the center axis of the battery. These two configurations are commonly used at the present in connection with automotive and truck batteries. However, the principles of the invention could readily be adapted to other configurations.

Second, the present invention is illustrated in connection with a six-cell battery. The invention could easily be adapted to batteries having a different number of cells, such as 4 or 8 cells.

In the following discussion of the present invention applied to the six-cell battery, the six cells and their corresponding structure are identified with suffixes a–f. Elements which correspond to any of the six cells are labeled as "NNx," where "NN" is the number identifying the structural element and "x" is the letter identifying the associated cell. When only "NN" is referenced, it is intended that the discussion of the element "NN"0 applies generically to all other like elements.

Figure 1:
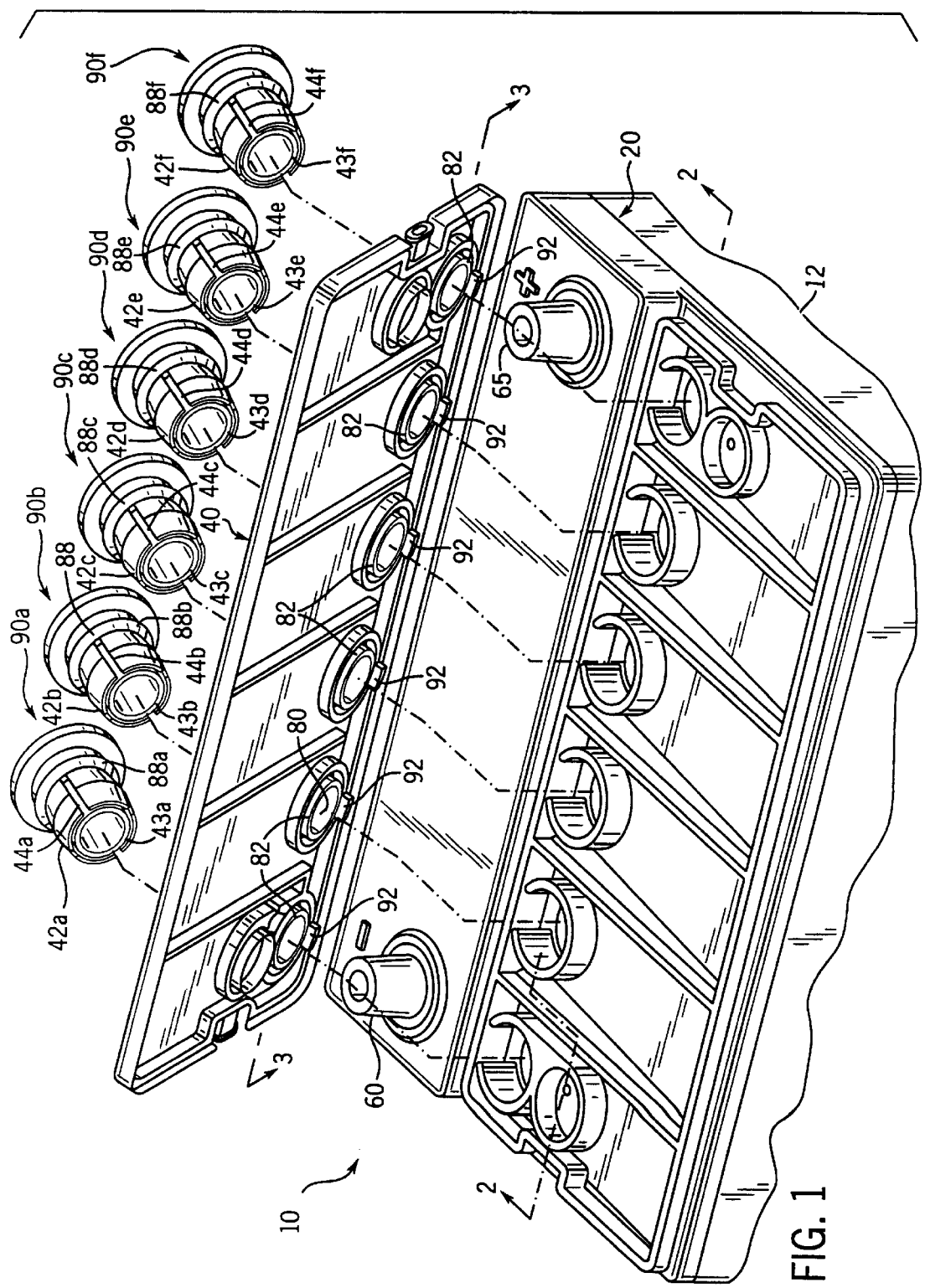
FIG. 1 is an exploded top perspective view of a battery incorporating the present invention.

Proceeding now to a description of the first and the preferred embodiment of the present invention, the perspective view of a primary cover 20 and a secondary cover 40 are illustrated in FIG. 1. The primary cover 20 is adapted to fit over a conventional battery casing 12 of the type which includes six cells containing battery plates, separators and electrolyte. In the illustrated, rectangular configuration, the primary cover 20 includes a negative terminal post 60 and a positive terminal post 65. The two covers 20, 40 are typically made from the same type of material used for conventional batteries and battery casing, namely polyethylene or polypropylene materials which are able to withstand the harsh environment of lead-acid batteries.

Figure 2:
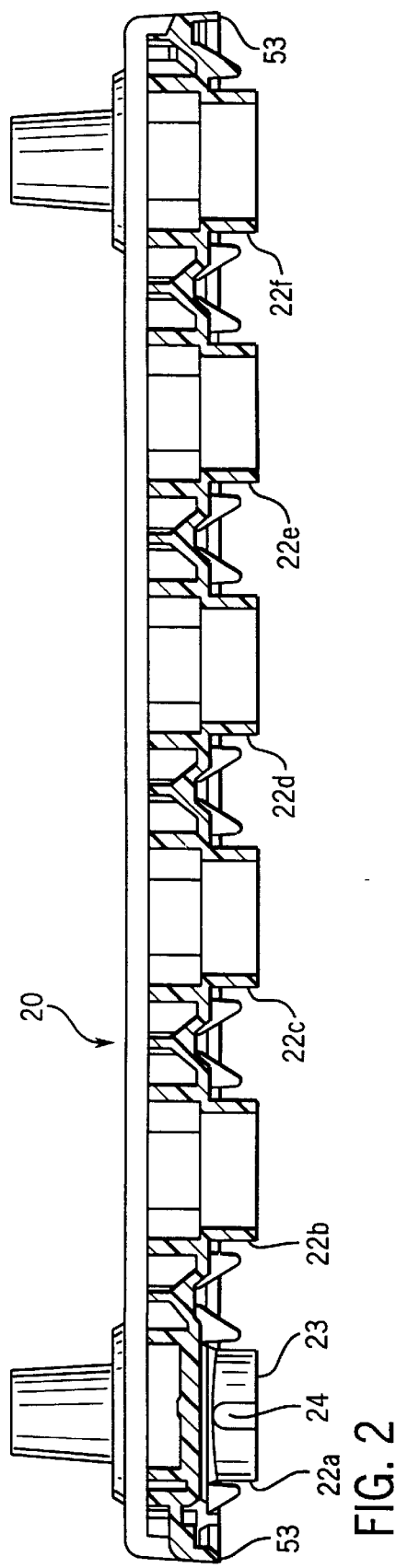
FIG. 2 is a sectional view of the battery cover taken along line 2—2 of FIG. 1.
Figure 5:
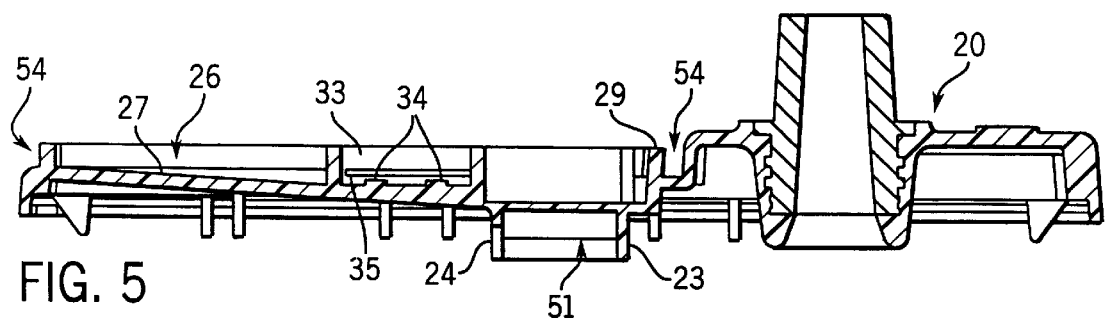
FIG. 5 is a sectional view of the primary cover taken along line 5—5 of FIG. 4.
Figure 6:
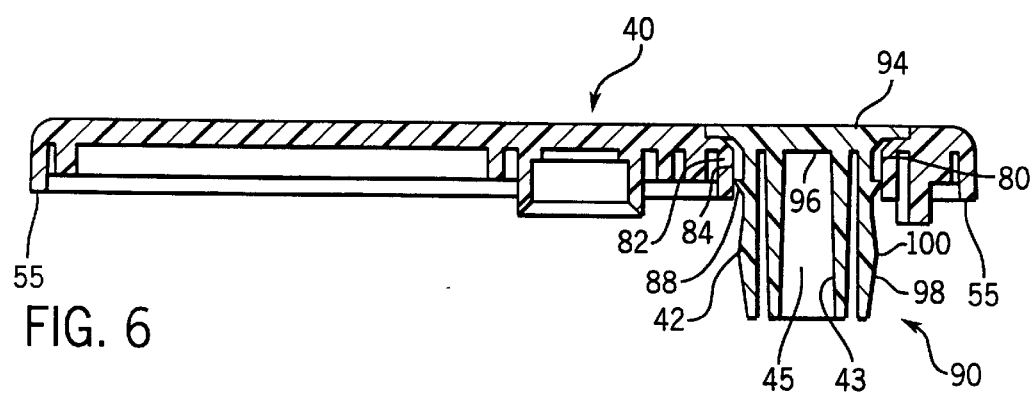
FIG. 6 is a sectional view of the secondary cover with a baffling plug taken along line 6—6 of FIG. 4.

As shown best in FIG. 2, a lip 53 is provided around the edge of the primary cover 20 to allow it to be attached to the battery casing in a conventional manner, which includes sealing the two components through adhesives, heated platens, ultrasonic welding, and other techniques known in the art for joining such materials. Likewise, a lip 55 is provided around the edge of the secondary cover 40 to allow it to be attached to the primary cover 20 in a similar conventional manner. As best seen in FIGS. 5 and 6, the lip 55 of the secondary cover 40 is inserted into recessed grooves 54 provided on the primary cover 20.

The attachment of the terminals to the electrodes of the battery cells located beneath the primary cover 20 will not be explained in detail, as those components, in and of themselves, are not part of the present invention. It will be understood, however, that the negative plates of the cell located beneath negative terminal post 60 will be coupled electrically to that terminal post, while the positive plates of the cell located beneath positive terminal post 65 will be similarly coupled to that terminal post.

Figure 4:
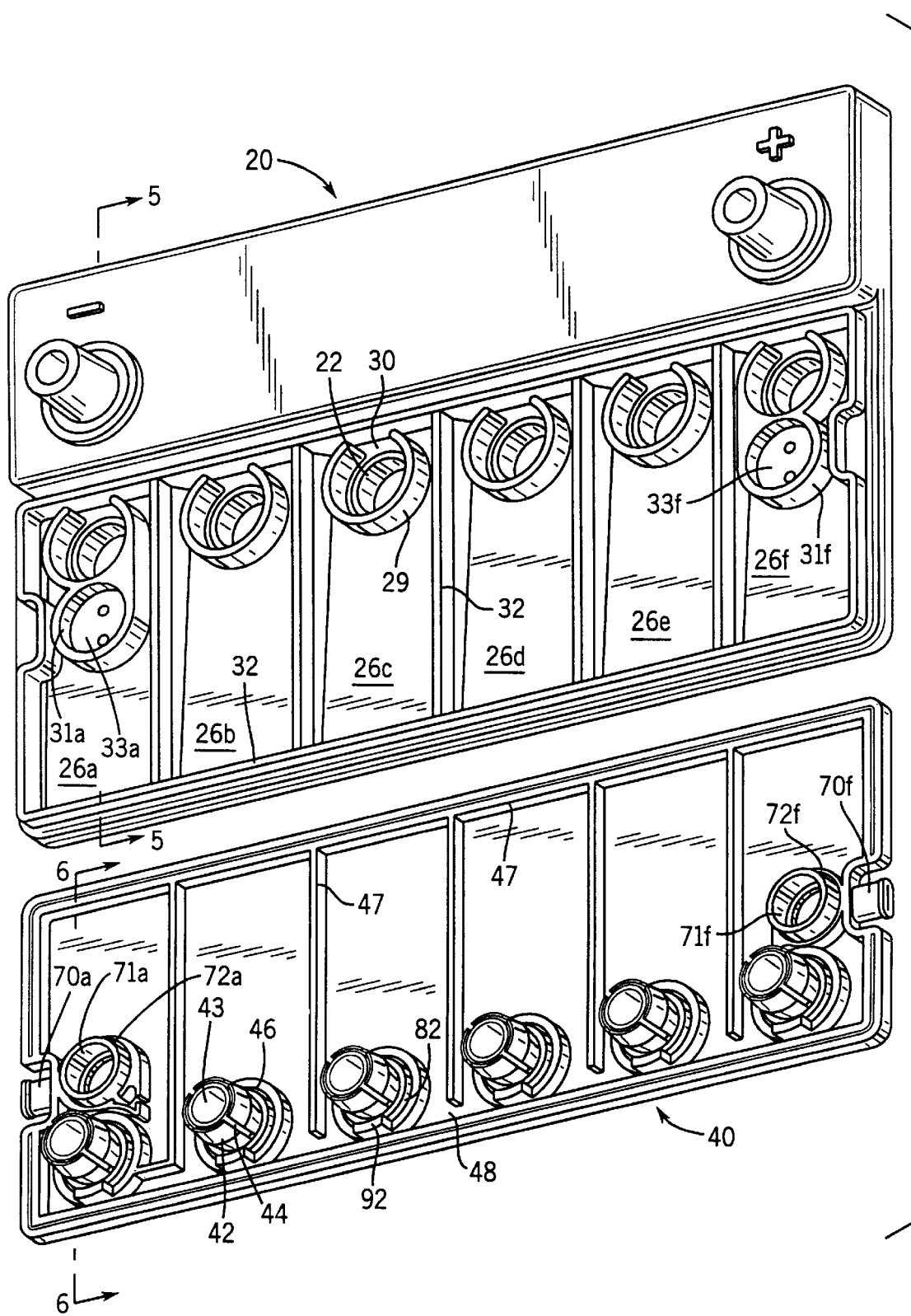
FIG. 4 is a top perspective view of the primary cover and a bottom perspective view of the secondary cover with the baffling plugs of FIG. 1.

Primary cover 20 includes six splash barrels, numbered 22a, 22b, 22c, 22d, 22e and 22f (See FIG. 2), and arranged in a linear, spaced-apart relationship, as illustrated best in FIG. 4. The barrels 22a–f extend downwardly from the surface of the primary cover 20 and are positioned for alignment with the respective cells of the battery when the primary cover 20 is attached to the battery casing.

FIG. 2 is a sectional view of the primary cover taken along line 2—2 of FIG. 1 and shows barrels 22a–f. The view of barrel 22a is a plan view, whereas views of barrels 22b–f are sectional views. The structure of the barrels 22a–f is identical and a discussion of one barrel applies equally to the other five barrels. As shown in FIG. 2, each barrel 22 has a generally cylindrical tubular portion 23 which extend downward into its respective cell.

At the bottom tip of the barrel 22, on a side away from the posts 60, 65, a generally rectangular cutout 24 is provided. The cutout 24 is provided to allow electrolyte to flow more easily into the cells of the battery when the battery is initially filled with electrolyte. The cutout 24 is positioned on a side of the barrel away from the posts 60, 65, because electrolyte filling is usually conducted with the battery tilted with the posts 60, 65 higher with respect to the barrels 22a–f.

The primary cover 20 provides a plurality of baffles which tend to isolate electrolytes which escape from the cells of the battery through the barrels 22a–f. One set of such baffles defines the walls 32 which isolate the primary cover 20 six sectors 26a–f. Each sector 26 has a generally rectangular shaped and a lower surface 27 (labeled in FIG. 5.) which is inclined. FIGS. 4 and 5 show the incline of the lower surface 27 to be increasing in a direction away from the centerline of the battery. The inclined lower surface 27 allows the electrolyte which has escaped into the sector 26 to drain into the barrel 22 by the force of gravity.

Another set of baffles is a set of c-shaped ridges 29a–f (only one labeled) which is located above and around each barrel 22. The c-shaped ridges 29 isolate the barrels 22 from the sector 26 except through the open section of their c-shape. As shown in FIG. 4, the open section of a c-shaped ridge 29 is aligned toward the low side of the inclined surface 27. The alignment of the open section in such a manner is important to combat electrolyte leakage from tilting. When the battery is tilted post side up, the electrolyte will be trapped by the closed section of the c-shaped ridge 29. When the battery is tilted post side down, the electrolyte will be trapped by the partition wall 32 adjacent to the open section and will eventually drain back into the cell.

Adjacent to the open section of the c-shaped ridge 29, a flat portion 30 is provided on the inclined surface 27. The flat portion 30 allows the electrolyte to drain more easily into the barrel 22 once any electrolyte which escaped into sector 26 reaches the open section of the c-shaped ridge 29. As shown in FIG. 5, the height of the c-shaped ridge 29 is equal to the height of the walls 32 which partition the primary cover 20 into the sections 26a–f. The primary cover 20 also has formed thereon two circular ridges 31a and 31f which define receptacles 33a and 33f. These will be described hereafter.

Referring back to FIG. 1, the secondary cover 40 is joined to the primary cover to allow gases released from the cells to escape while preventing the electrolyte in the battery to leak out. The secondary cover 40 has a plurality of baffles which generally correspond to the plurality of baffles arranged on the primary cover 20. When the secondary cover 40 is attached to the primary cover 20, and the baffles on the primary cover are joined to the baffles on the secondary cover, a plurality of openings emerge through the baffles. These openings define passageways through which evolved gases released from the cells of the battery may escape.

The secondary cover 40 also has a plurality of fill holes 80a–f (only one labeled), each of which are surrounded by a retention ring 82 (only one labeled), and are arranged to correspond concentrically with the barrels 22a–f of the primary cover 20. The fill holes 80a–f provide a path for the electrolyte when filling the cells. The retention rings 82a–f have an inside diameter substantially equal to the fill hole diameters, and extend away from the secondary cover bottom. A retention ring inner wall 84a–f substantially parallel the fill hole axes 86a–fengages a retaining member 88a–f of a baffling plug 90a–f to retain the member in the fill hole and form a seal to prevent the escape of the electrolyte.

Referring to FIG. 4, the secondary cover 40 has o-shaped ridges 46a–f (only one labeled) which are concentric with the retention rings 82a–f, and are aligned to correspond with the c-shaped ridges 29a–f of the primary cover 20. The joining of the o-shaped ridge 46 with the c-shaped ridge 29 creates a cylindrical barrier which is sealed on one side to the primary cover 20 and on the other side to the secondary cover 40. The only break or opening through this cylindrical barrier is through the open section of c-shaped ridge 29. A tooth 92 extending from the O-shaped ridge 46 into the open section of the c-shaped ridge 29 reduces the size of the opening when the primary and secondary covers are assembled together. The smaller opening further improves the baffling characteristics of the assembled covers.

The secondary cover 40 further includes a plurality of partition walls 47 which correspond to the partition walls 32 on the primary cover 20. The joining of the walls 47 with the walls 32 creates a plurality of compartments, whose wall boundaries define a rectangular shape. The only openings which allow gaseous communication between these compartments are through breaks 48 provided in the walls 47 of the secondary cover 40. The breaks 48 are positioned adjacent to a wall side which faces the open section of the c-shaped ridge 29. The positioning of the breaks 48 in such a manner is important to combat electrolyte leakage from tilting. When the battery is tilted post side up, electrolytes will be trapped at the far end (the end which is farther from the center axis of the battery), because there are no breaks in the partitions of the compartment at this end. When the battery is tilted post side down, electrolytes could flow over partition wall 32 through the break 48 provided on the secondary cover 20, but before this happens, tests conducted have shown that most, if not all, of the electrolyte will drain back into the cell.

External ports 70a, 70f are also provided on the secondary cover 40. Each external port 70 is in gaseous communication with a corresponding cylindrical conduit 71, which is surrounded by a partially open circular ridge 72 formed on the secondary cover 40. The partially open circular ridge 72 is aligned to be opposite to the circular ridge 31, such that when the two are joined, the opening through the partially open circular ridge 72 defines the sole passageway for gas.

The cylindrical conduit 71 is received in the receptacle 33 of the primary cover 20. The diameter of the cylindrical conduit 71 is less than that of the receptacle 33 and when received within the receptacle 33, the cylindrical conduit 71 does not extend to the bottom of the receptacle 33. In other words, gaps remain in the annular region between cylindrical conduit 71 and the receptacle 33 and between the bottom of the receptacle 33 and the axial end of the cylindrical conduit 71.

In the preferred embodiment, bosses 34 are provided atop the bottom surface of the receptacle 33 (see FIG. 5). A porous plate 35 (only shown in FIG. 5) is inserted into the receptacle 33 atop the bosses 34 before the cylindrical conduit 71 of the secondary cover is received into the receptacle 33. The bosses 34 prevent the submersion of the porous plate 35 under the rare conditions where electrolytes have escaped into receptacle 33.

The evolved gases from the cells of the battery reach the external ports 70a, 70f in the following manner. First, gases are evolved in the respective cells as a result of charge and discharge reaction taking place therein. Second, these gases travel upwards in the annular region between the outer guard 42 and the inner guard 43, until they escape through the slots 44 into the cylindrical chamber defined by the joining of c-shaped ridge 29 and the o-shaped ridge 46. The gases then travel through the open section in the c-shaped ridge 29 into the rectangular shaped compartment. From there, they escape through the break 48 in the partition walls 47, until they reach the rectangular shaped compartment corresponding to one of the end sectors, either 26a or 26f. The gases then enter the annular region between the receptacle 33 and the cylindrical conduit 71 through the partially open section of the partially open circular ridge 72. At this point, the gases pass through the porous plate 35 into the center region of the cylindrical conduit 71 and out the external port 70. The porous plate 35 functions as a final device for preventing electrolyte from reaching the external port 70, if any electrolyte has traveled the just described circuitous route to reach the porous plate 35.

Figure 3:
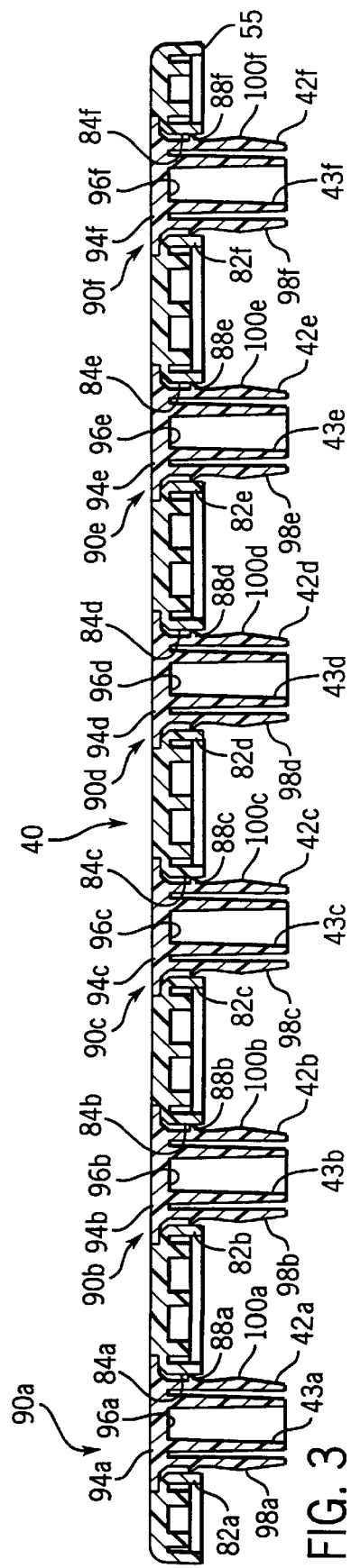
FIG. 3 is a sectional view of the secondary battery cover with baffling plugs taken along line 3—3 of FIG. 1.

As best shown in FIGS. 3 and 6, baffling plug 90 is pressed into the fill hole 80 formed in the secondary cover 40 to inhibit the escape of the electrolyte from the cells. Each baffling plug 90 has a lid 94 with a bottom 96, a pair of tubular splash guards 42, 43 extending from the lid bottom 96, and a retaining member 88 for retaining the plug 90 in the fill hole 80. The splash guards include a coaxially arranged outer tubular splash guard 42 and inner tubular splash guard 43. When the plug 90 is pressed into the fill hole 80 the splash guards 42, 43 extend into the barrels 22 of the primary cover 20. In the preferred embodiment, the retaining member 88 is formed as an integral part of the outer splash guard 42.

Figure 7:
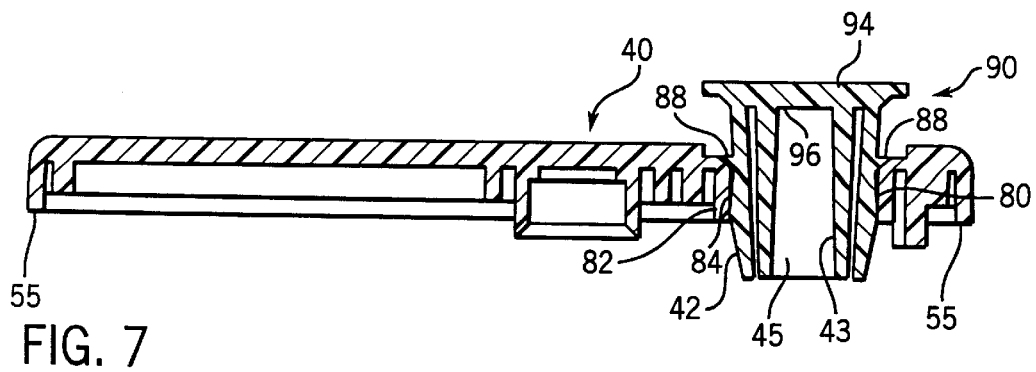
FIG. 7 is a sectional view of the secondary cover with a partially inserted baffling plug taken along line 6—6 of FIG. 4.
Figure 8:
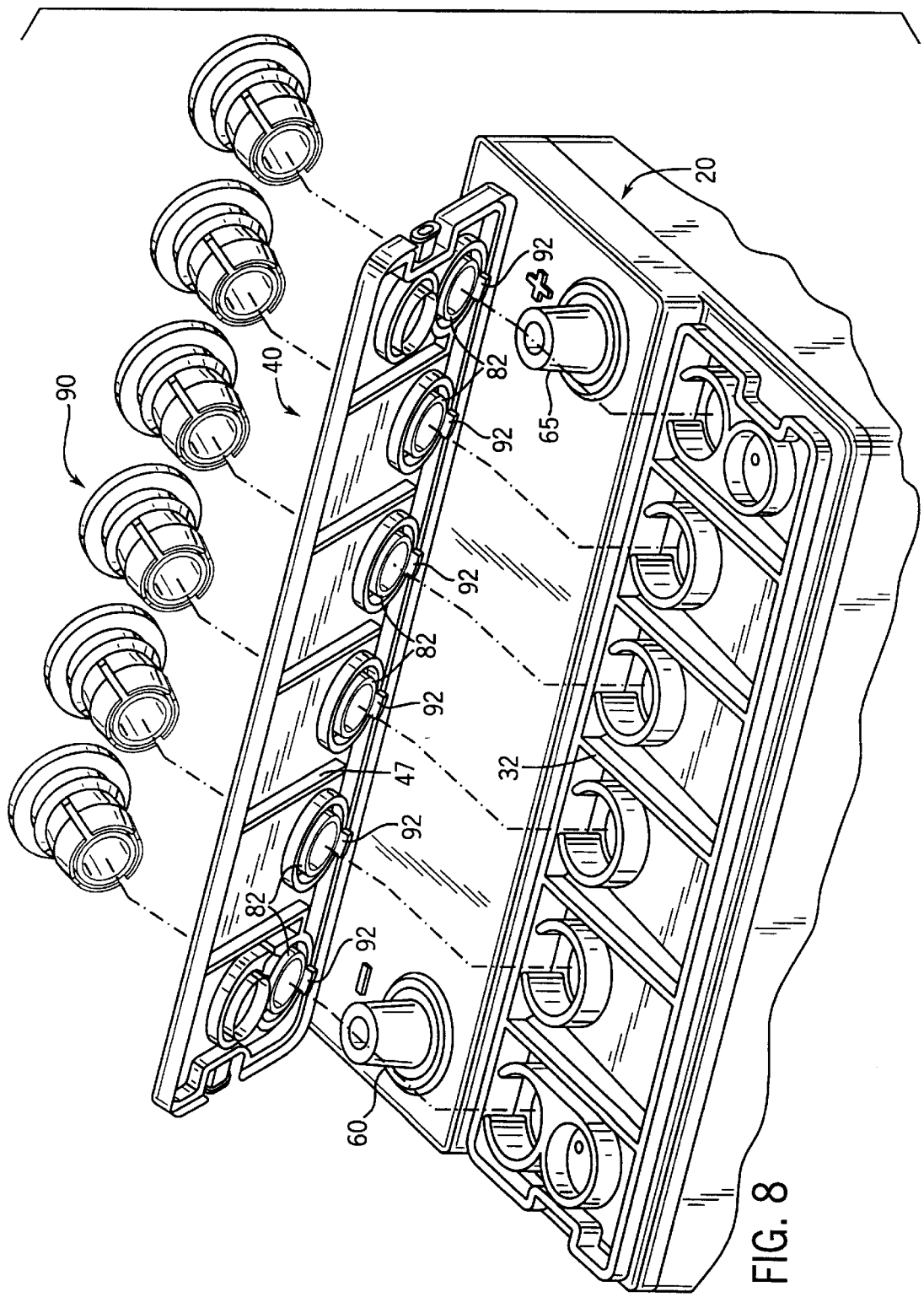
FIG. 8 is a perspective view of a primary cover and a secondary cover according to a second embodiment of the present invention.

Looking particularly at FIG. 7, the outer guard 42 has wedge shaped portion to provide a temporary retaining member during battery assembly. The guard 42 has an outer surface 98 with a ridge 100 having an outer diameter greater than the fill hole diameter to form the wedge shape. As shown in FIG. 7, by providing a ridge diameter larger than the fill hole diameter, the outer guard 42 is cammed inward when the ridge 100 is forced through the fill hole 80 and retention ring 82, and expands once the ridge 100 passes through the retention ring 82. Advantageously, the ridge 100 is a temporary retaining member and allows the plugs 90$a$–$f$ to be loosely inserted into the fill holes 80$a$–$f$ after the cells are filled with the electrolyte, and prior to the plugs 90$a$–$f$ being pressed into place further down an assembly line. The temporary retaining members prevents the plugs 90$a$–$f$ from popping out as the battery travels down the assembly line.

The outer guard 42 and the inner guard 43 are substantially the same length. The extension of these splash guards into the barrel 22 ends near the line indicated by arrow 51 (shown in FIG. 5). The length of the tubular splash guards 42, 43 is critical because splash guards which are too long tend to create pumping action on the electrolyte contained in the cells which would force electrolyte into the covers. Splash guards which are too short do not prevent splashing satisfactory.

The outer tubular splash guards 42$a$–$f$ have slots 44$a$–$f$ formed through their surfaces. Explosive gases evolved in the cells escape through these slots 44$a$–$f$. The preferred embodiment has four slots for each outer tubular splash guard 42. The slots are formed symmetrically and extend from the lower tip toward the retaining member 88.

Each inner tubular splash guard 43 is aligned coaxially with a respective outer tubular splash guard 42 and defines an inner chamber 45 at its center. The only opening into the inner chamber 45 is through its bottom opening, so any evolved gases and electrolyte driven into the inner chamber 45 are returned to the cells through the bottom opening of the inner chamber 45.

The tubular splash guards 42, 43 operate to knock electrolytes back into the cells when the battery is being vibrated. The slots 44 allow adequate release of the gases evolved in the cells. It is preferred that the slots 44 extend along the whole length of the outer guard 42, because the desired amount of gaseous communication through the slots 44 is achieved above the barrel 22 in the region encompassed by c-shaped ridge 29, the width of which is large enough to permit gaseous communication with the annular region between the inner and outer tubular members.

Each plug 90$a$–$f$ is retained in the respective fill hole 80$a$–$f$ by the respective retaining member 88$a$–$f$. In the preferred embodiment, the retaining member 88 is a wedge-shaped flange surrounding the annular base 92 having an angled surface 106 extending from the base bottom 96 outwardly toward the base top 94, and an orthogonal surface 88 extending radially away from the base 88. Forcing the plug 90 into the fill hole 80 compresses the retaining member 88 against the retention member inner wall 84 to create an interference press fit which seals the fill hole 80 and retains the plug 90 therein. Advantageously, the compressed retaining member 88 presses against the retention member inner wall 84 causing a cold flow of the retention ring material to form a ring seal which prevents the electrolyte from escaping through the fill hole 80.

FIG. 7 is a perspective view of a venting system according to a second embodiment of the present invention. In the second embodiment, the posts 60, 65 of the battery are aligned along the centerline of the battery. The structural elements of the primary cover 20 and the secondary cover 40 are identical to that of the first embodiment. The only differences are in the dimensions, e.g. lengths of the partition walls 32, 47 and the length of the secondary cover 40.

Using the above described embodiments, venting of evolved gases and prevention of electrolyte leakage are achieved favorably. The venting of the gases is achieved through the passageways described above. The prevention of electrolyte leakage is achieved in the following manner.

First, the coaxial splash guards operate to suppress electrolyte leakage into the cylindrical chamber which is formed when the c-shaped ridge 29 and the o-shaped ridge 46 are joined together. If electrolyte still leaks into this cylindrical chamber and into the sector 26 through the open section of the c-shaped ridge, the electrolyte will not enter an adjacent rectangular shaped compartment unless it has accumulated sufficiently to flow over the partition walls 32 through the break 48. Otherwise, gravity acting on the electrolyte through the inclined surface 27 will force the electrolyte toward the open section of the c-shaped ridge 29 to be drained into the barrel 22. Further, even if electrolyte reaches the end sectors 26$a$, 26$f$, it must accumulate sufficiently at the end sectors 26$a$, 26$f$, so as to reach a level higher than the ridge height of the circular ridge 31 in order for the electrolyte to leak into the receptacle 33 through the partially open section of the partially open circular ridge 72. Leakage of electrolyte is further prevented by the porous plate 35 which is effective against electrolyte leakage as long as the porous plate 35 is not completely submerged in the electrolyte.

While particular embodiments according to the invention have been illustrated and described above, it will be clear that the invention can take a variety of forms and embodiments within the scope of the appended claims.

We claim:

1. A battery having electrolyte therein and a vent cap assembly, the vent cap assembly comprising:

a casing defining at least one electrolyte containing cell;

a primary cover fixed to said casing having a top side, bottom side, and at least one barrel extending away from said bottom side into said cell;

a secondary cover fixed to said primary cover top, and having a top side, bottom side, and at least one aperture concentric with said primary cover barrel; and a baffling plug disposed in said secondary cover aperture and extending into said barrel, said baffling plug having a primary retaining member which engages said primary cover barrel to retain said baffling plug in a fully inserted position in said primary cover barrel, and a temporary retaining member which engages said primary cover barrel, to retain said baffling plug in a partially inserted position in said primary cover barrel wherein said temporary retaining member does not engage said primary cover barrel when said baffling plug is in the fully inserted position.

2. The battery as in claim 1, wherein said baffling plug forms a seal in said aperture.

3. The battery as in claim 2, wherein said seal is formed by a cold flow of material surrounding said baffling plug.

4. The battery as in claim 1, wherein an o-shaped ridge formed on said secondary cover top side surrounds said aperture and corresponds with a c-shaped ridge formed on the primary cover bottom side.

5. The battery as in claim 4, wherein a tooth formed on said o-shaped ridge extends into an opening formed by said c-shaped ridge.

6. The battery as in claim 1, wherein the baffling plug has a lid with a bottom, an inner tubular splash guard extending away from said lid bottom, an outer splash guard concentrically spaced from said inner tubular splash guard, and a primary retaining member formed part of said outer splash guard.

7. A battery cover suitable for use with a battery casing defining at least one electrolyte containing cell, comprising:

a primary cover having a top side, bottom side, and at least one barrel extending away from said bottom side;

a secondary cover mounted to said primary cover top, and having a top side, bottom side, and at least one aperture concentric with said primary cover barrel; and a baffling plug disposed in said secondary cover aperture and extending into said barrel, said baffling plug having a primary retaining member which engages said primary cover barrel to retain said baffling plug in a fully inserted position in said primary cover barrel, and a temporary retaining member which engages said primary cover barrel to retain said baffling plug in a partially inserted position in said primary cover barrel, wherein said temporary retaining member does not engage said primary cover barrel when said baffling plug is in the fully inserted position.

8. The battery as in claim 7, wherein said baffling plug forms a seal in said aperture.

9. The battery as in claim 8, wherein said seal is formed by a cold flow of material surrounding said baffling plug.

10. The battery cover as in claim 7, wherein a retaining ring surrounds said aperture.

11. The battery cover as in claim 7, wherein an o-shaped ridge formed on said secondary cover top side surrounds said aperture and corresponds with a c-shaped ridge formed on the primary cover bottom side.

12. The battery cover as in claim 11, wherein a tooth formed on said o-shaped ridge extends into an opening formed by said c-shaped ridge.

13. The battery cover as in claim 7, wherein the baffling plug has a lid with a bottom, an inner tubular splash guard extending away from said lid bottom, and outer splash guard concentrically spaced from said inner tubular splash guard, and said primary retaining member is formed as part of said outer splash guard.

14. An electrolyte baffling plug for insertion into an aperture formed in a battery cover, said plug comprising:

a lid having a bottom;

an inner tubular splash guard extending from said lid bottom, and insertable into an aperture formed in a battery cover;

an outer splash guard extending from said lid bottom, and concentrically spaced from said inner tubular splash guard, said outer splash guard being insertable in the aperture with the inner splash guard;

a primary retaining member formed part of said outer splash guard which retains said baffling plug in a fully inserted position in the aperture; and a temporary retaining member is formed on said outer splash guard which retains said baffling plug in a partially inserted position in the aperture, wherein said temporary retaining member does not engage walls of said aperture when said baffling plug is in the fully inserted position.

15. The baffling plug as in claim 14, wherein said temporary retaining member is a ridge formed on an outer surface of said outer splash guard bottom, and outer splash guard concentrically spaced from said inner tubular splash guard, and said primary retaining member is formed as part of said outer splash guard.

16. The baffling plug as in claim 14, wherein slots are formed in said outer splash guard.

17. The baffling plug as in claim 14, wherein said primary retaining member is a flange formed part of said outer splash guard, and having an engagement surface.

* * * * *